US008078570B2

(12) United States Patent
Chen et al.

(10) Patent No.: US 8,078,570 B2
(45) Date of Patent: Dec. 13, 2011

(54) VERSIONING DATA WAREHOUSES

(75) Inventors: Ying Chen, San Jose, CA (US); Bin He, San Jose, CA (US); William Scott Spangler, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/434,378

(22) Filed: May 1, 2009

(65) Prior Publication Data

US 2010/0280991 A1 Nov. 4, 2010

(51) Int. Cl.
*G06F 17/30* (2006.01)

(52) U.S. Cl. .......................................................... 707/600

(58) Field of Classification Search .............. 707/2, 101, 707/203, 600

See application file for complete search history.

(56) References Cited

U.S. PATENT DOCUMENTS

| | | | | |
|---|---|---|---|---|
| 6,003,036 | A | 12/1999 | Martin | |
| 6,353,835 | B1 * | 3/2002 | Lieuwen | 1/1 |
| 6,766,326 | B1 | 7/2004 | Cena | |
| 6,795,821 | B2 | 9/2004 | Yu | |
| 2005/0131964 | A1 * | 6/2005 | Saxena | 707/203 |
| 2006/0020619 | A1 | 1/2006 | Netz et al. | |
| 2006/0026199 | A1 | 2/2006 | Crea | |
| 2007/0083572 | A1 | 4/2007 | Bland et al. | |
| 2007/0239769 | A1 | 10/2007 | Fazal et al. | |
| 2007/0260578 | A1 | 11/2007 | Ghosh | |
| 2010/0005114 | A1 * | 1/2010 | Dipper | 707/101 |

* cited by examiner

*Primary Examiner* — Etienne Leroux

(74) *Attorney, Agent, or Firm* — Shimokaji & Associates, P.C.

(57) ABSTRACT

A method, system, and computer program product are disclosed. Exemplary embodiments of the method, system, and computer program product may include hardware, process steps, and computer program instructions for supporting versioning in a data warehouse. The data warehouse may include a data warehouse engine for creating a data warehouse including a fact table and temporary tables. Updated or new data records may be transferred into the data warehouse and bulk loaded into the temporary tables. The updated or new data records may be evaluated for attributes matching existing data records. A version number may be assigned to data records and data records may be marked as being the most current version. Updated and new data records may be bulk loaded from the temporary tables into the fact table when a version number or a version status is calculated.

20 Claims, 18 Drawing Sheets

| PMKEY | | | |
|---|---|---|---|
| RAW_KEY | PRI_KEY | VERSION | ISCURRENT |
| 1 | AAA | 1 | 1 |
| 2 | BBB | 1 | 0 |
| 3 | BBB | 2 | 1 |

| DIM1_MAP | |
|---|---|
| RAW_KEY | TAB_KEY |
| 1 | 1 |
| 1 | 2 |
| 2 | 3 |
| 3 | 1 |

| DIM1 | |
|---|---|
| TAB_KEY | ATTR1 |
| 1 | v1 |
| 2 | v2 |
| 3 | v3 |

| DIM2 | |
|---|---|
| RAW_KEY | ATTR2 |
| 1 | u1 |
| 2 | u2 |
| 2 | u3 |
| 3 | u4 |

RAW_PMKEY

| RAW_KEY | PRI_KEY | VERSION | ISCURRENT |
|---|---|---|---|
| 4 | CCC | 1 | 1 |
| 5 | DDD | 1 | 1 |
| 6 | BBB | 1 | 0 |
| 7 | EEE | 1 | 0 |
| 8 | EEE | 2 | 1 |
| 9 | BBB | 2 | 1 |

RAW_DIM1

| RAW_KEY | ATTR1 |
|---|---|
| 4 | v1 |
| 6 | v4 |
| 7 | v5 |
| 8 | v6 |
| 9 | v7 |
| 9 | v8 |

RAW_DIM2

| RAW_KEY | ATTR2 |
|---|---|
| 4 | u3 |
| 5 | u2 |
| 7 | u4 |
| 8 | u5 |
| 8 | u6 |
| 9 | u7 |

| RAW_PMKEY | | | |
|---|---|---|---|
| RAW_KEY | PRI_KEY | VERSION | ISCURRENT |
| 4 | CCC | 1 | 1 |
| 5 | DDD | 1 | 1 |
| 6 | BBB | 1 | 0 |
| 7 | EEE | 1 | 0 |
| 8 | EEE | 2 | 1 |
| 9 | BBB | 2 | 1 |

| RAW_PK_TMP1 | | |
|---|---|---|
| RAW_KEY | PRI_KEY | MAXVERSION |
| 3 | BBB | 2 |

| PMKEY | | | |
|---|---|---|---|
| RAW_KEY | PRI_KEY | VERSION | ISCURRENT |
| 1 | AAA | 1 | 1 |
| 2 | BBB | 1 | 0 |
| 3 | BBB | 2 | 1 |
| 4 | CCC | 1 | 1 |
| 5 | DDD | 1 | 1 |
| 6 | BBB | 3 | 0 |
| 7 | EEE | 1 | 0 |
| 8 | EEE | 2 | 1 |
| 9 | BBB | 4 | 1 |

60

| PMKEY | | | |
|---|---|---|---|
| RAW_KEY (62) | PRI_KEY (64) | VERSION (66) | ISCURRENT (68) |
| 1 | AAA | 1 | 1 |
| 2 | BBB | 1 | 0 |
| 3 | BBB | 2 | 0 |
| 4 | CCC | 1 | 1 |
| 5 | DDD | 1 | 1 |
| 6 | BBB | 2 | 0 |
| 7 | EEE | 1 | 0 |
| 8 | EEE | 2 | 1 |
| 9 | BBB | 3 | 1 |

70

| DIM1_MAP | |
|---|---|
| RAW_KEY (62) | TAB_KEY (72) |
| 1 | 1 |
| 1 | 2 |
| 2 | 3 |
| 3 | 1 |
| 4 | 1 |
| 6 | 4 |
| 7 | 5 |
| 8 | 6 |
| 9 | 7 |
| 9 | 8 |

80

| DIM1 | |
|---|---|
| TAB_KEY (72) | ATTR1 (85) |
| 1 | v1 |
| 2 | v2 |
| 3 | v3 |
| 4 | v4 |
| 5 | v5 |
| 6 | v6 |
| 7 | v7 |
| 8 | v8 |

75

| DIM2 | |
|---|---|
| RAW_KEY (62) | ATTR2 (86) |
| 1 | u1 |
| 2 | u2 |
| 2 | u3 |
| 3 | u4 |
| 4 | u3 |
| 5 | u2 |
| 7 | u4 |
| 8 | u5 |
| 8 | u6 |
| 9 | u7 |

FIG.11

RAW_PMKEY

| RAW_KEY | PRI_KEY | ISCURRENT |
| --- | --- | --- |
| 4 | CCC | 1 |
| 5 | DDD | 1 |
| 6 | BBB | 0 |
| 7 | EEE | 0 |
| 8 | EEE | 1 |
| 9 | BBB | 1 |

RAW_DIM1

| RAW_KEY | ATTR1 |
| --- | --- |
| 4 | v1 |
| 6 | v4 |
| 7 | v5 |
| 8 | v6 |
| 9 | v7 |
| 9 | v8 |

RAW_DIM2

| RAW_KEY | ATTR2 |
| --- | --- |
| 4 | u3 |
| 5 | u2 |
| 7 | u4 |
| 8 | u5 |
| 8 | u6 |
| 9 | u7 |

260

| PMKEY | | |
|---|---|---|
| RAW_KEY (262) | PRI_KEY (264) | ISCURRENT (268) |
| 1 | AAA | 1 |
| 2 | BBB | 0 |
| 3 | BBB | 0 |
| 4 | CCC | 1 |
| 5 | DDD | 1 |
| 6 | BBB | 0 |
| 7 | EEE | 0 |
| 8 | EEE | 1 |
| 9 | BBB | 1 |

280

| DIM1 | |
|---|---|
| TAB_KEY (272) | ATTR1 (285) |
| 1 | v1 |
| 2 | v2 |
| 3 | v3 |
| 4 | v4 |
| 5 | v5 |
| 6 | v6 |
| 7 | v7 |
| 8 | v8 |

270

| DIM1_MAP | |
|---|---|
| RAW_KEY (262) | TAB_KEY (272) |
| 1 | 1 |
| 1 | 2 |
| 2 | 3 |
| 3 | 1 |
| 4 | 1 |
| 6 | 4 |
| 7 | 5 |
| 8 | 6 |
| 9 | 7 |
| 9 | 8 |

275

| DIM2 | |
|---|---|
| RAW_KEY (262) | ATTR2 (286) |
| 1 | u1 |
| 2 | u2 |
| 2 | u3 |
| 3 | u4 |
| 4 | u3 |
| 5 | u2 |
| 7 | u4 |
| 8 | u5 |
| 8 | u6 |
| 9 | u7 |

FIG.18

VERSIONING DATA WAREHOUSES

BACKGROUND OF THE INVENTION

The present invention relates generally to the field of data organization, and more specifically, to the versioning of data in data warehouses.

Enterprises are building what some would consider significantly sizable data warehouses to enable analytics. Analytic techniques may provide a way to unlock the power of information and improve business performance. For instance, it is known to employ data warehousing and analytics solutions to identify the reputation of a business product by collecting people's opinions on the Web. In some applications, Web data may be constantly collected, ingested and processed into the data warehouses to enable analytics. Throughout such a data flow Web pages may be frequently updated, for example, when new content is added, or existing content is revised or deleted, or while other Web pages might simply be inserted as newly collected Web pages.

In the field of data warehouse management, it is known to manually update changed records via low-level Relational database management system (RDBMS) operations. This approach may be practical when the number of users is relatively low and there are only occasional and small numbers of updates.

It is also known to update data records in a data warehouse by replacing the previous version of the data record with an updated file. The previous version is then removed or deleted from the system. Thus, the ability to track changes or perform data analysis on data over time in a data record may be irretrievable.

Therefore, there is a need for a method and system that provides a versioning scheme to data warehouse management.

SUMMARY OF THE INVENTION

In one aspect, the present invention comprises a method for use with a data warehouse whose data records are recorded on a storage medium and wherein the data warehouse is managed by a data warehouse engine and wherein the data warehouse includes a fact table including a primary key associated with each respective data record and wherein the fact table organizes respective data records by their respective primary key, where the method comprises the steps of: identifying existing data records in the fact table by their respective primary keys; assigning a first version number to respective existing data records in the fact table wherein the first version number is tied to a first occurrence of a primary key in the fact table; extracting new data records for updating existing data records from at least one data source; evaluating each of the new data records for a respective primary key identifying each of said new data records; setting up temporary tables including a temporary fact table; loading the new data records into the temporary tables; assigning an updated version number to new data records with a primary key that matches the primary key of an existing data record; and populating the fact table in the storage medium with the new data records wherein the new data records include respective updated version numbers and wherein the fact table further includes the existing data records.

In another aspect, the present invention comprises method for use with a data warehouse whose data records are recorded on a storage medium and wherein the data warehouse is managed by a data warehouse engine and wherein the data warehouse includes a fact table including a primary key associated with each respective data record and wherein the fact table organizes respective data records by their respective primary key, where the method comprises the steps of; identifying existing data records in the fact table by their respective primary keys; assigning a current version status to respective existing data records in the fact table, wherein the current version status identifies whether the primary key of an existing data record is a most current version of the primary key; extracting new data records from at least one data source; evaluating each of the new data records for a respective primary key identifying each of said new data records; setting up temporary tables including a temporary fact table; bulk loading the new data records into the temporary tables; identifying updated primary keys as the most current version in the new data records when a primary key of a new data record matches the primary key of an existing data record; and populating the fact table in the storage medium with the new data records wherein the new data records include the new data records identified as the most current version and wherein the current version status of primary keys associated with the new data records identified as the most current version are updated.

In a further aspect, the present invention comprises a system, comprising a computer including a central processing unit for an extraction and organization of data from one or more data sources; and a data warehouse configured to store and update data from the one or more data sources, wherein the data warehouse includes a schema comprising a fact table storing existing data records, wherein the data warehouse further includes temporary tables configured to receive new data records in bulk from the computer, wherein the central processing unit evaluates the new data records for updated copies of the stored existing data records and assigns a version number to the existing and new data records, wherein the central processing unit provides an update to the fact table by bulk insertion of the new data records into the fact table, and wherein the existing and new data records are identified by the version number.

In a further aspect of the invention, a computer program product for updating data records in a data warehouse managed in a storage medium, comprising a computer usable medium having computer usable program code embodied therewith, the computer usable program code comprising a set of instructions for extracting new data records from a data source; a set of instructions for assigning a raw key entry to each new data record extracted; a set of instructions for bulk loading the new data records into temporary tables; a set of instructions for finding existing data records to be updated; a set of instructions for updating found existing data records to be updated; a set of instructions for assigning a version number to updated data records; and a set of instructions for populating a fact table in the data warehouse of the storage medium with the updated data records.

These and other features, aspects and advantages of the present invention will become better understood with reference to the following drawings, description and claims.

BRIEF DESCRIPTION OF THE DRAWINGS

FIG. 11 is an illustration depicting a resulting data warehouse in accordance with an exemplary embodiment of the present invention;

FIG. 18 is an illustration depicting a resulting data warehouse in accordance with another exemplary embodiment of the present invention.

DETAILED DESCRIPTION OF THE INVENTION

Figure 1:
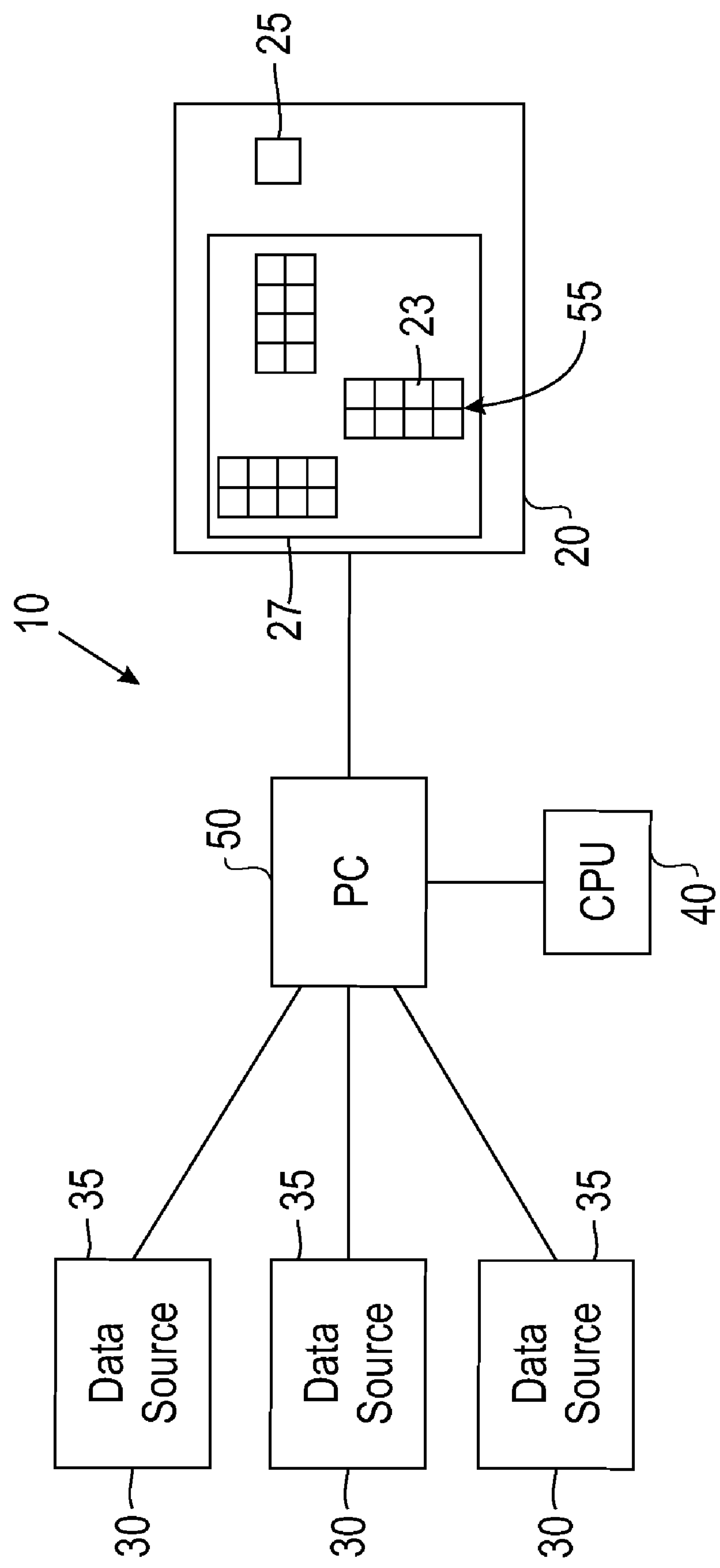
FIG. 1 is a block diagram illustrating a system for organizing and updating data records in accordance with an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address some of the problems discussed above. Further, one or more of the problems discussed above may not be fully addressed by any of the features described below.

Broadly, embodiments of the present invention provide a method, a system or computer program product for supporting versioning in a data warehouse. Exemplary embodiments of the present invention provide a method and system that store updated data records along with their associated existing parent data records while tracking versions of a record as it is updated. Exemplary embodiments of the present invention may further provide a method and system that may employ temporary staging tables for organizing and analyzing data records and further can bulk transfer data records to their destination reference tables.

Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to the drawings, FIG. 1 is a schematic representation of a system 10 in accordance with an exemplary embodiment of the present invention. The system 10 may include a data warehouse 20 in communication with a computer 50 and central processing unit 40 executing software commands in the computer 50. The data warehouse 20 may include a data warehouse engine 25 for the creation and administration of data warehouse tables 27 storing existing data records 23. Multiple data sources 30 storing new data records 35 may be in communication with the computer 50. When a data record is referred to in general, it may be referred to as a data record 55. In an exemplary application, the system 10 may be used during an extract, transfer, and load process where data records may be extracted from the data sources 30, transferred into the computer 50 where the central processing unit 40 executes commands organizing and storing the data records in the data warehouse 20. It will be understood that new data records 35 may be entirely new data files or updated data files of existing records 23.

Figure 2:
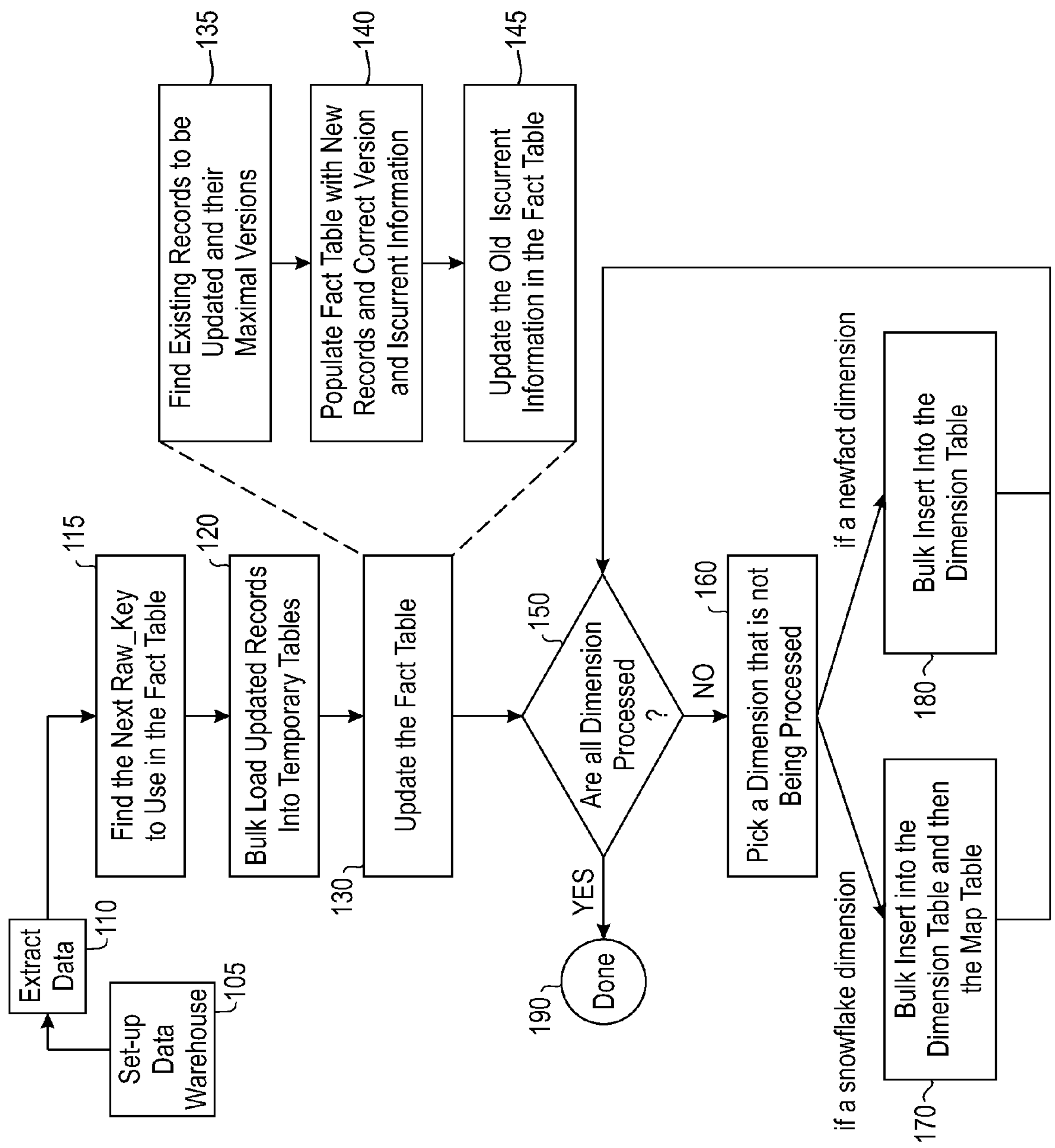
FIG. 2 is a flowchart illustrating a method of organizing and updating data records in accordance with an exemplary embodiment of the present invention.

With recurring reference to FIG. 2 and illustrative FIGS. 3-11, an exemplary embodiment of the present invention is described. FIG. 2 illustrates a series of steps according to an exemplary method 100 of the invention. FIGS. 3-11 depict in two dimensional form, exemplary transformations and executions of the steps according to FIG. 2.

Figure 3:
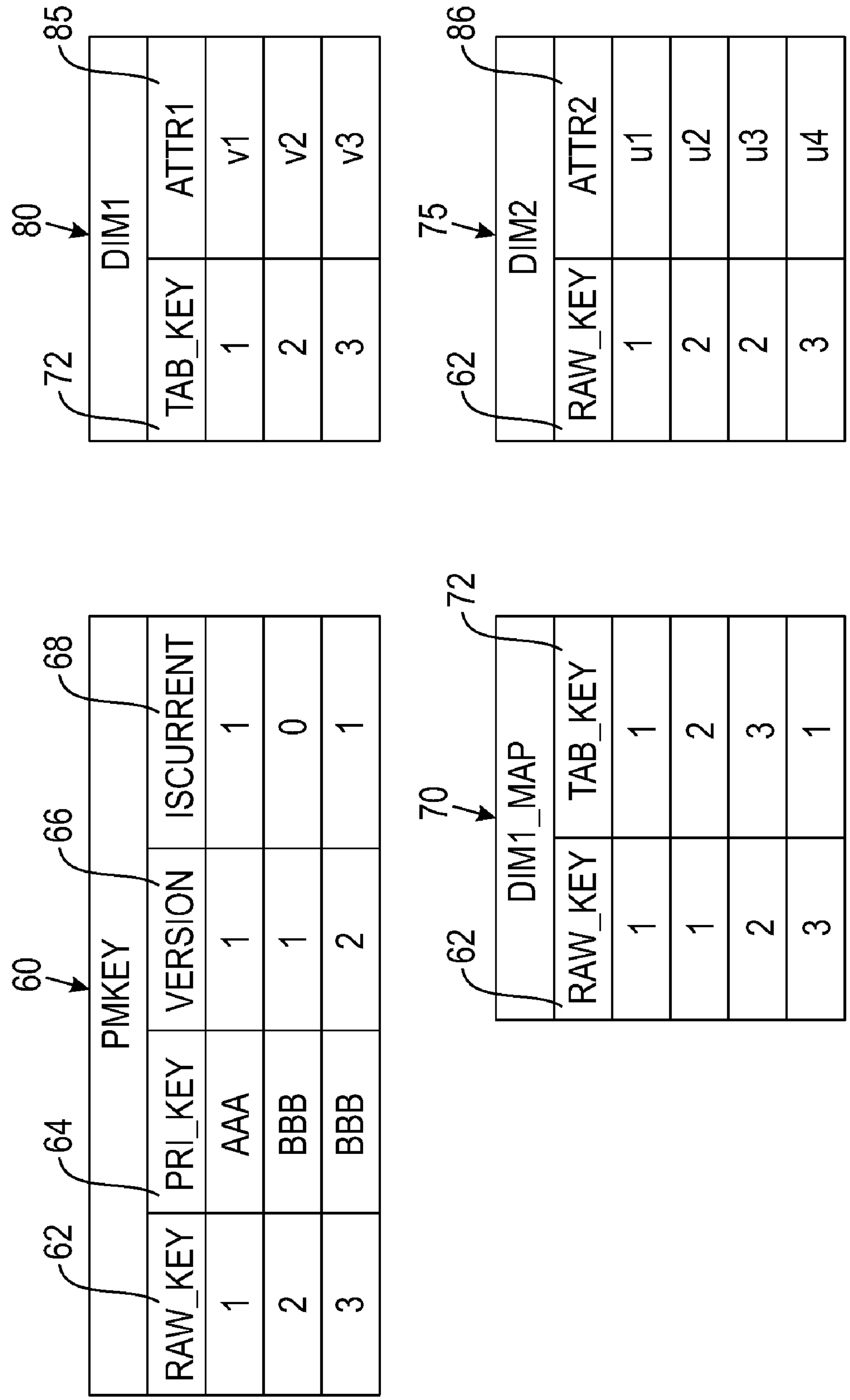
FIG. 3 is an illustration depicting a data warehouse set up in accordance with an exemplary embodiment of the present invention.

Referring to FIGS. 2 and 3, a data warehouse 20 may be set up in step 105 by way of a data warehouse engine 25. One exemplary data warehouse 20 may comprise a fact table 60 along with dimension tables 75 and 80 for each dimension. It will be understood that the fact table 60 and dimension tables 75 and 80 may be labeled and set up according to a particular application and that any desirable number of dimensions may be utilized and any data warehouse schema may be employed in the setup. For example, in FIG. 3, a data warehouse 20 may be set up using known data warehouse schemas such as a snowflake and newfact model schemas. The fact table 60 may be labeled "PMKEY" and may include existing data records 23 organized by column. In this exemplary illustration, the fact table 60 may include columns labeled: "RAW_KEY"; "PRI_KEY"; "VERSION"; and "ISCURRENT". The column labeled "RAW_KEY" may represent entries 62 of data records 55 into the data warehouse 20. In this example, the fact table 60 depicts three raw key entries 62 of existing data records 23 numbered "1", "2", and "3" representing the number of raw key entries 62 in the fact table 60 at the present state. Each raw key entry 62 may be associated with a primary key 64 representing a primary attribute found in a data record 55 and represented by the column labeled "PRI_KEY". The primary key 64 may be user defined representing for example, a file name or a URL. Each primary key 64 may be associated with a version number 66 represented by the column labeled "VERSION" representing what version a data record 55 is in the fact table 60. A current version status value 68 may be represented by the column labeled "ISCURRENT" signifying whether the version number 66 is the latest version of the data record 55. In one exemplary embodiment, a value of "0" may signify that the current version status 68 is not the most current version and a value of "1" may signify that the current version status is the most current version.

Referring still to FIG. 3, the data warehouse 20 may also include a dimension table 80 labeled "DIM1", a dimension table 75 labeled "DIM2" and a dimension map table 70 labeled "DIM1_MAP". The dimension table 80 depicts a snowflake model and may comprise two columns representing a tab key value 72 and an attribute 85. The dimension table 75 depicts a newfact model and may comprise a column representing occurrences of raw key entry 62 and a column representing occurrences of an attribute 86. The map table 70 may comprise a column representing occurrences of raw key entry 62 and a column representing the tab key value 72. The tab key value 72 may be an attribute representing a primary key of the dimension values. The dimension tables 75 and 80 may store unique dimension values, with each unique dimension value corresponding to a tab key value 72. The dimension map table 70 may store the relationships between the fact table 60 and a dimension table (75;80). For instance, if the fact table 60 were used to store articles and the dimension table 75 stores authors, an author's map table (dimensional map table 70) may store which articles are written by which authors.

In one exemplary embodiment, the relationship among the elements in FIG. 3 may be described as follows: each entry of a data record 55 into data warehouse 20 may be tracked in the fact table 60 and may result in an incremental increase in the raw key entry 62. Each raw key entry 62 may be tied to an occurrence of a primary key 64, the version number 66 of each primary key 64 occurrence, and the current version status for each primary key 64 occurrence. In this exemplary illustration, there are three entries of existing data records 23 in the data warehouse 20 as depicted by the column labeled RAW_KEY; in other words there are three raw key entries 62. There are two primary keys 64 labeled "AAA" and "BBB". The primary key 64 labeled "BBB" occurs twice in the current state of the fact table 60. Raw key 62 numbered "2" depicts the first occurrence of primary key 64, "BBB" and depicts this occurrence as the first version number 66 and shows the current version status 68 as not being the most current. Raw key entry 62 numbered "3" depicts the second occurrence of primary key 64, "BBB" and depicts this occurrence as the second version number 66 and shows the current version status as being the most current.

Referring back to FIG. 2, step 110 may include extracting new data records 35 from data sources 30. The method 100 may include analyzing the fact table 60 for the latest raw key entry 62 value and, in step 115 associating the next raw key entry 62 value with a new data record 35 and its primary key 64 extracted from the data sources 30. It will be understood that the step 115 may be repeated for every new data record 35 that may be desired for transfer to the fact table 60 and that multiple new data records 35 may be simultaneously extracted and transferred.

Figure 4:
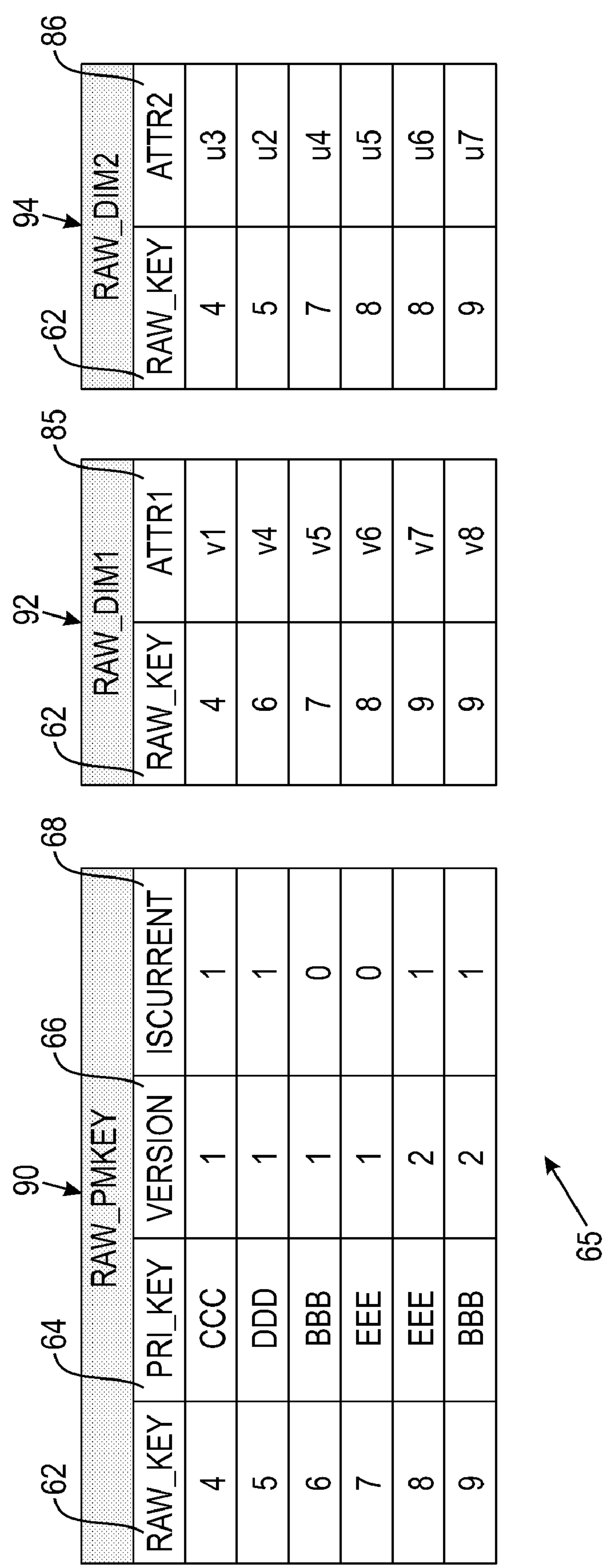
FIG. 4 is an illustration depicting a data warehouse with temporary tables set up in accordance with an exemplary embodiment of the present invention.

Referring to FIGS. 1, 2, and 4, temporary tables 65 may be set up in the data warehouse 20 for the temporary storage and organization of new data records 35. The temporary tables 65 may include a temporary staging fact table 90 which may be labeled "RAW_PMKEY". In this exemplary illustration, the temporary staging fact table 90 may include columns analogous to the columns labeled in fact table 60 including: "RAW_KEY"; "PRI_KEY"; "VERSION"; and "ISCURRENT" with analogous values entered in each respective column. The temporary tables 65 may also include temporary staging dimension tables 92 and 94 labeled "RAW_DIM1" and "RAW_DIM2" respectively. Temporary staging dimension table 92 may include a column labeled "RAW_KEY" representing raw key values 62 and a column labeled "ATTR1" representing attribute values 85. Temporary staging dimension table 94 may include a column labeled "RAW_KEY" representing raw key values 62 and a column labeled "ATTR2" representing attribute values 86.

In step 120, a bulk loading of new data records 35 may be inserted into the temporary tables 65. The new data records 35 may be inserted into the temporary staging fact table 90 and depending on the attribute values of individual new data records 35, entries may be inserted into the temporary dimension tables 92 and 94. For example, raw key entry 62 numbered "4" associated with primary key 64 "CCC" includes an attribute 85 that may be updated according to temporary dimension table 92. The same is depicted for raw key entries 62 numbered "6" and "9" associated with primary key 64 "BBB" and raw keys 62 numbered "7" and "8" associated with primary key 64 "EEE". For illustrative purposes, it is also depicted that a new data record 35 entered as raw key entry 62 numbered "5" may not be entered into the temporary dimension table 92 because it may not have an attribute value 85 qualifying it for insertion.

The values for the version number 66 and current version status 68 may be computed using a "localized" strategy by the data warehouse engine 25. For example, the version numbers 66 may be computed according to the data in the "RAW_PMKEY" temporary staging table 90 without having to check the "PMKEY" fact table 60. For instance, although the primary key 64 "BBB" occurs in the "PMKEY" fact table 60, in the "RAW_PMKEY" temporary staging table 90, the version of the primary key 64 for "BBB" may still start from a version numbered "1". Since the primary key 64 labeled "BBB" occurs twice in "RAW_PMKEY" temporary staging table 90, the first occurrence may be considered as not current, while the second one may be current as depicted in FIG. 4 in that particular table.

Figure 5:
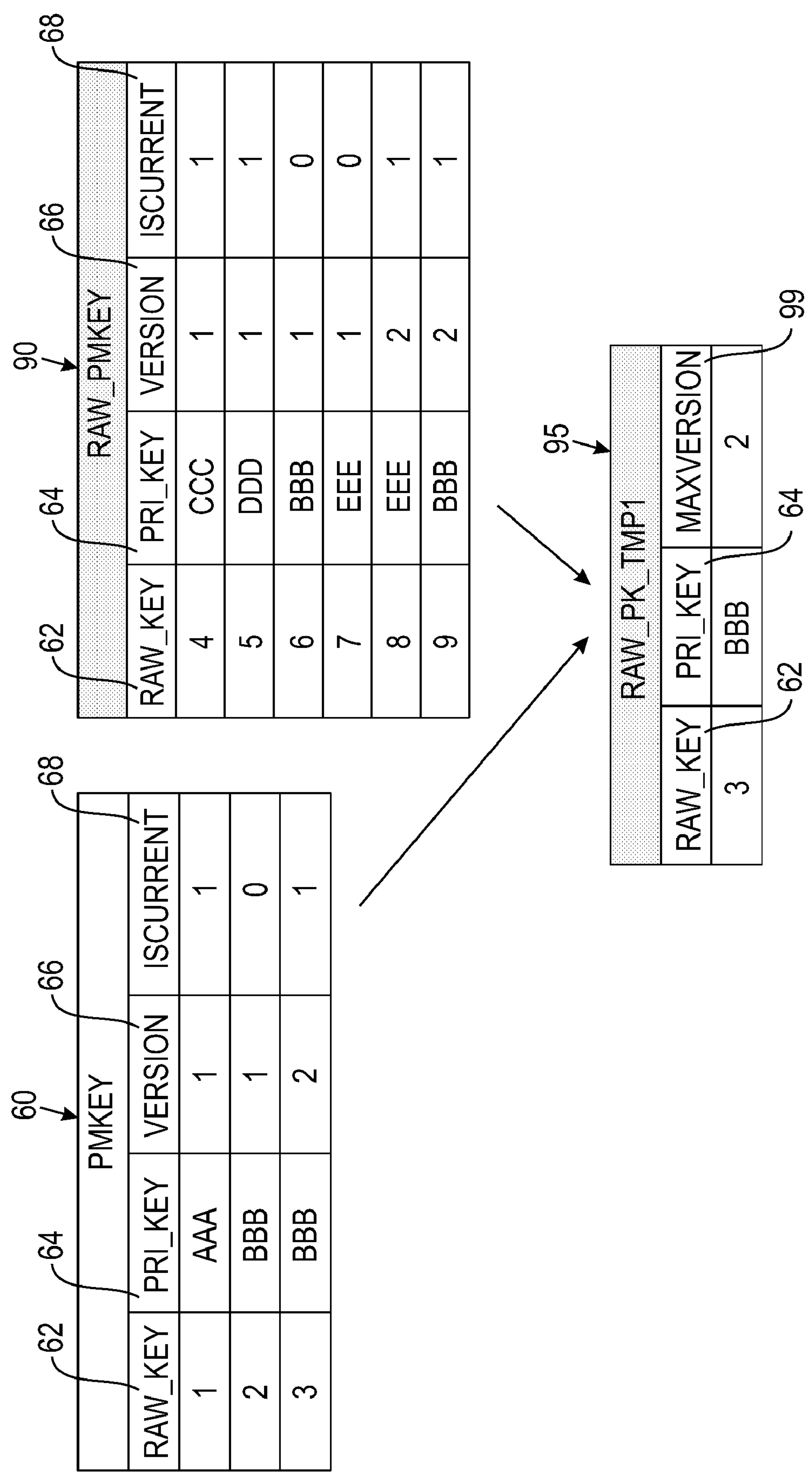
FIG. 5 is an illustration depicting a step of updating and organizing data records in accordance with an exemplary embodiment of the present invention.

Referring to FIGS. 1, 2, and 5, once the new data records 35 are bulk-loaded into different temporary dimension tables 92 and 94 and the temporary staging table 90, the method 100 may, in step 130, update the fact table 60. Step 130 may include steps 135, 140, and 145 described as follows. In step 135, the data warehouse engine 25 may identify which data records 55 may be meant for new versions of existing data records 23 in the data warehouse 20 and which ones may be meant for entering as new insertions. To this end, the data warehouse engine 25 may employ "join" executable command functions. A "join" function may be executed between the "RAW_PMKEY" temporary staging table 90 and the "PMKEY" fact table 60 to distinguish which data records 55 are to be updated and which ones are to be newly inserted. An exemplary resulting temporary table 95, "RAW_PK_TMP1" is depicted employing a result of such a "join" function. An exemplary query with such "join" conditions may be described as:

```
SELECT PMKEY.RAW_KEY, PMKEY.PRI_KEY, MAX
  (PMKEY.VERSION) FROM PMKEY, RAW_PMKEY
WHERE PMKEY.PRI_KEY=RAW_PMKEY.PRI_KEY
  AND PMKEY.ISCURRENT=1
```

The result of such a query may contain respective latest data records 55 that are to be updated with new versions, and is inserted into a temporary table RAW_PK_TMP1. One manner of performing the "join" function may include locating existing records 23 in "PM_KEY" fact table 60 with a current version status 68 of "1" and whose primary key 64 occurs in the "RAW_KEY" temporary staging table 90. Also as illustrated, the temporary table 95 may include a column listing a maximum version value 99 found for the primary key 64 processed in the "join" function.

Figure 6:
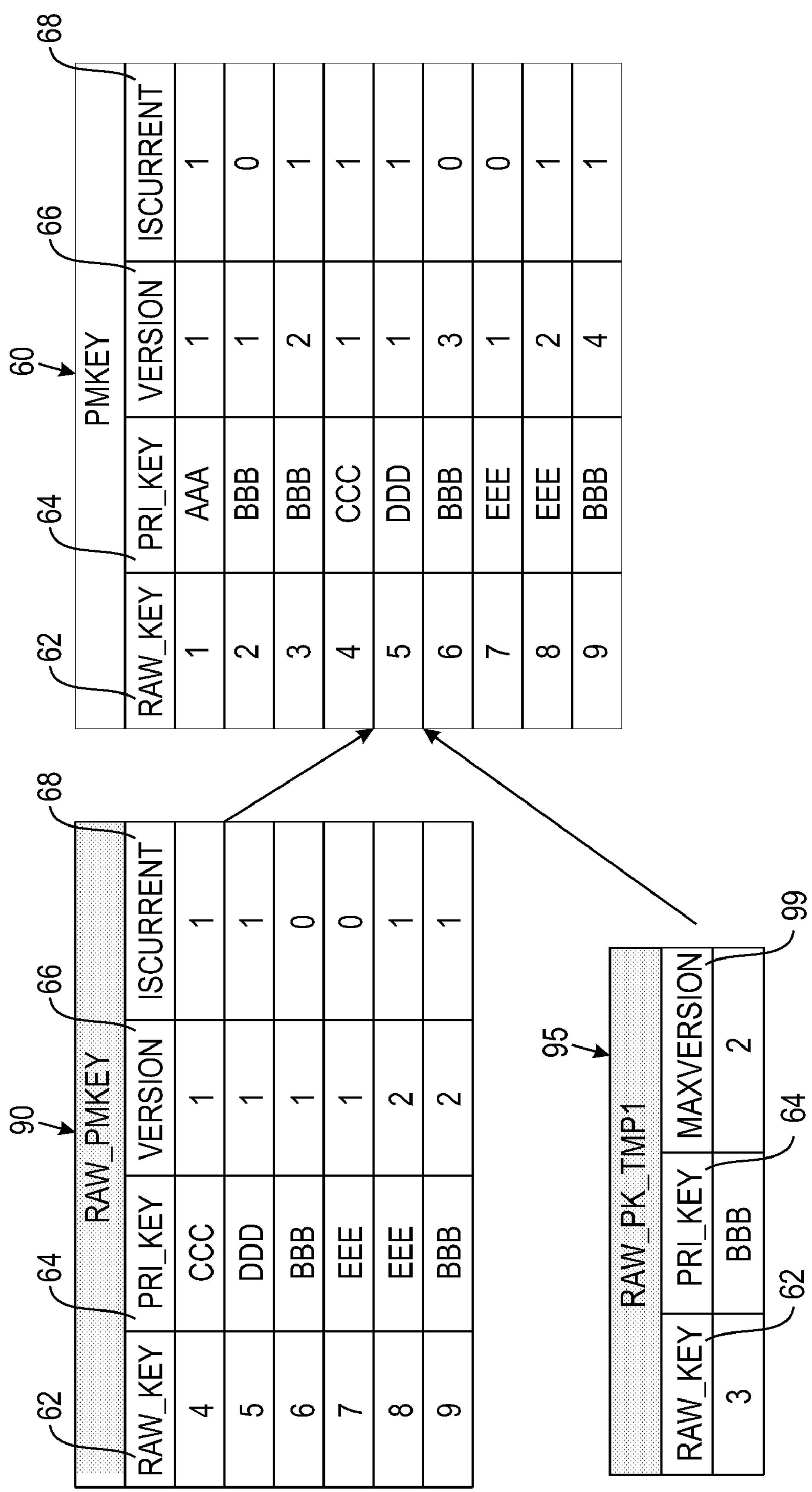
FIG. 6 is an illustration depicting a step of updating and organizing data records in accordance with an exemplary embodiment of the present invention.

Referring to FIGS. 1, 2, and 6, step 140 may include populating new data records 35 processed in the "RAW_PMKEY" temporary staging table 90 into the "PM_KEY" fact table 60. The temporary table 95 "RAW_PK_TMP1" may be used to compute the correct version numbers for new data records 35. An exemplary SQL to compute the population of the fact table 60 may be described as:

```
SELECT A.RAW_KEY, A.PRI_KEY, A.VERSION+COA-
  LESCE(B.MAXVERSION, 0), A.ISCURRENT
FROM RAW_PMKEY A, RAW_PK_TMP1 B
WHERE A.PRI_KEY=B.PRI_KEY
```

Figure 7:
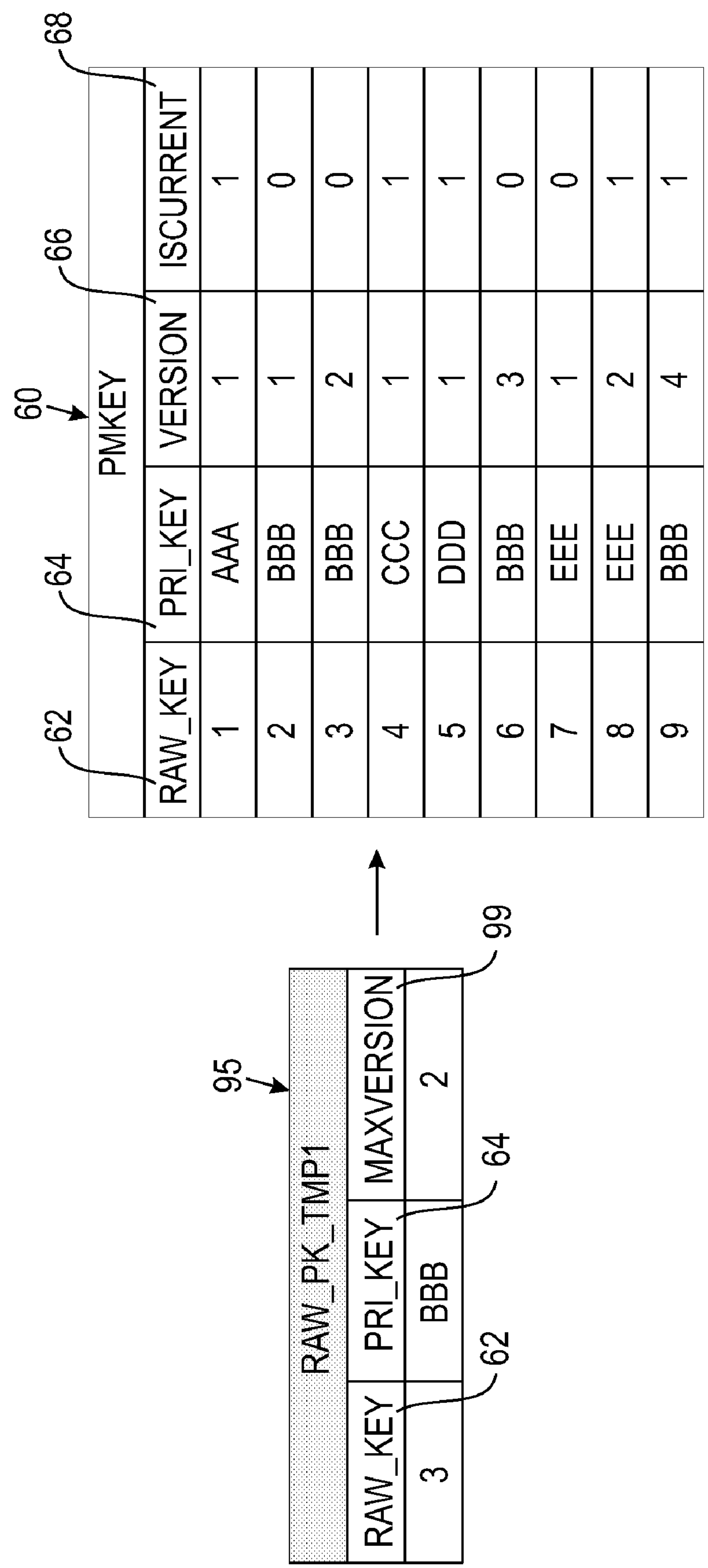
FIG. 7 is an illustration depicting a step of updating and organizing data records in accordance with an exemplary embodiment of the present invention.

As illustrated in FIG. 7, step 145 may include updating the old current version status 68 in the "PMKEY" fact table 60. One manner of updating the current version status 68 may include changing the current version status 68 to "0" in the "PM_KEY" fact table 60 for all the raw key values 62 in the fact table 60 corresponding to raw key values 62 in the "RAW_PK_TMP1" temporary table 95.

Figure 8:
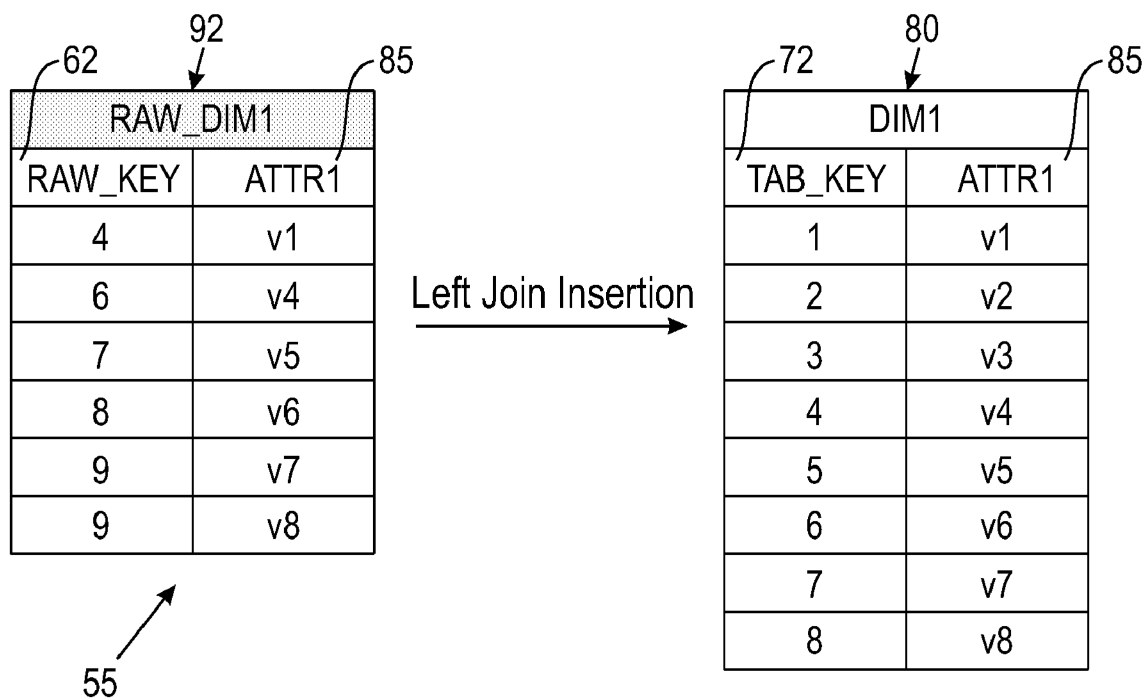
FIG. 8 is an illustration depicting a step of updating and organizing data records in accordance with an exemplary embodiment of the present invention.
Figure 9:
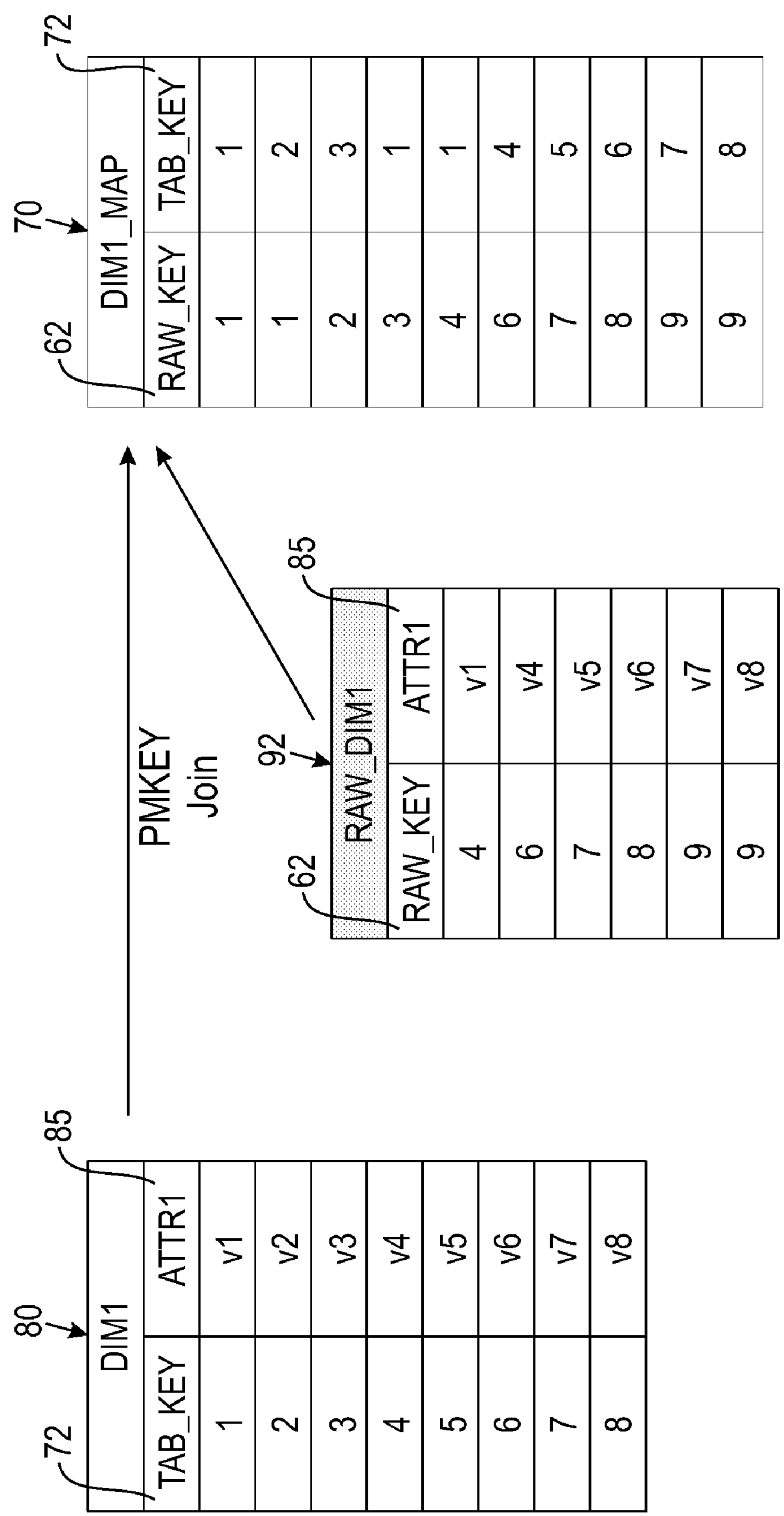
FIG. 9 is an illustration depicting a step of updating and organizing data records in accordance with an exemplary embodiment of the present invention.
Figure 10:
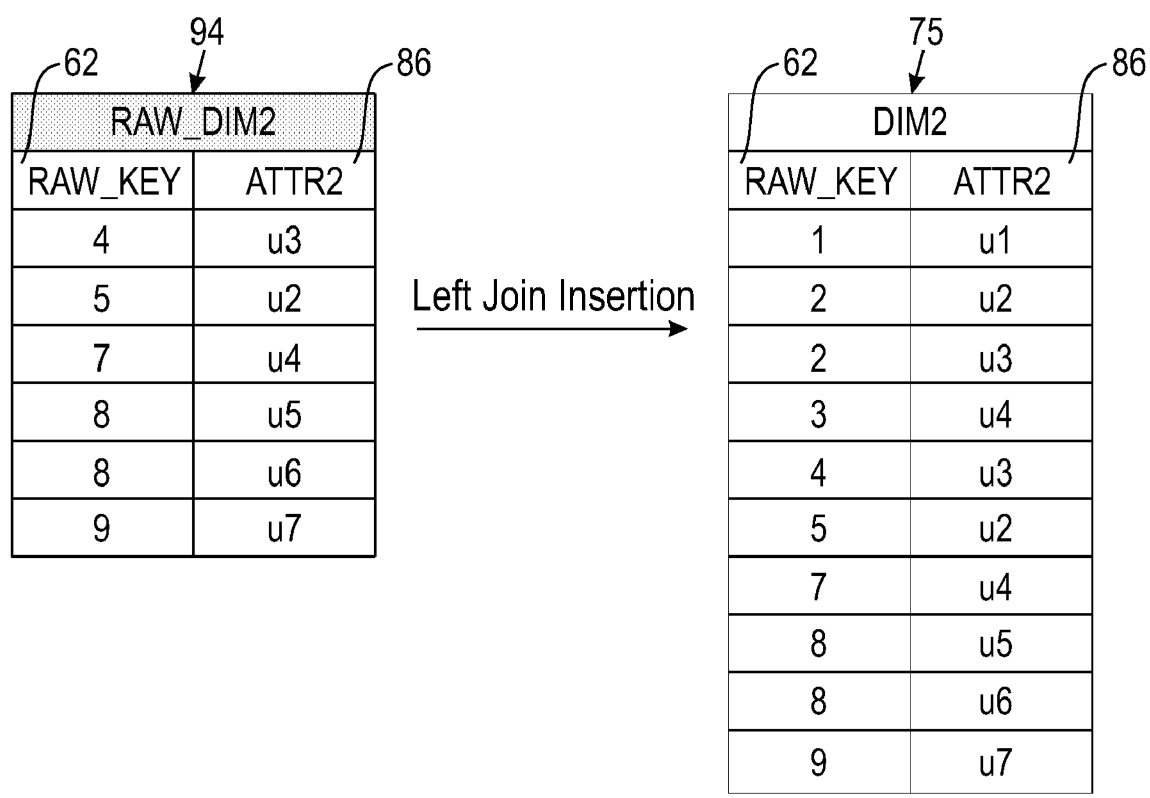
FIG. 10 is an illustration depicting a step of updating and organizing data records in accordance with an exemplary embodiment of the present invention.

As illustrated in FIGS. 8-10 and concurrently referring to FIGS. 1 and 2, the method 100 may check in step 150, for processing of all dimensions. For those dimensions still needing processing, the data warehouse engine 25 may bulk-load the new data records 35 into the temporary dimension tables 92 and 94. For example, in FIG. 8, "RAW_DIM1" temporary table 92 may have its data records 55 moved into the dimension table 80, "DIM1". The TAB_KEY values 72 may be internally generated and as illustrated, new values may be inserted in the dimension table 80. In some embodiments, data records 55 already appearing in dimension table 80 may not be transferred from temporary dimension table 92. In this example, the attribute value 85 of "v1" is not inserted because it previously appears in the dimension table 80, "DIM1".

Thus, new data records 35 may be populated from the temporary tables 65 for each dimension in step 160. As illustrated in FIG. 8, for a snowflake dimension, a "left-join" based bulk insertion may be performed to insert data records 55 from the temporary dimension table 92 "RAW_DIM1" into the dimension table 80 "DIM1". Unique new values in temporary dimension table 92 "RAW_DIM1" may be inserted into dimension table 80 "DIM1". The map table 70 "DIM1_MAP" may be populated by joining the temporary dimension table 92 "RAW_DIM1" and dimension table 80 "DIM1" tables on the attribute value 85 column "ATTR1" and selecting the corresponding raw key entry 62 and tab key value 72. FIG. 9 illustrates an exemplary result for processing a snowflake dimension as illustrated in FIG. 8.

As illustrated in FIG. 10, step 180 may comprise bulk insertion of data records 55 into a newfact dimension schema. Bulk insertion in a newfact dimension may include a "left-join" based bulk insertion to insert data records 55 from the temporary dimension table 94 "RAW_DIM2" into the dimensional table 75 "DIM2".

In step 190, the method 100 may be done and an exemplary result of the previous steps as illustrated in FIG. 3-10 may be depicted in FIG. 11. FIG. 11 depicts an updated fact table 60 "PM_KEY" and an updated map table 70 and dimension tables (75, 80) for each dimension that needed updating.

Figure 12:
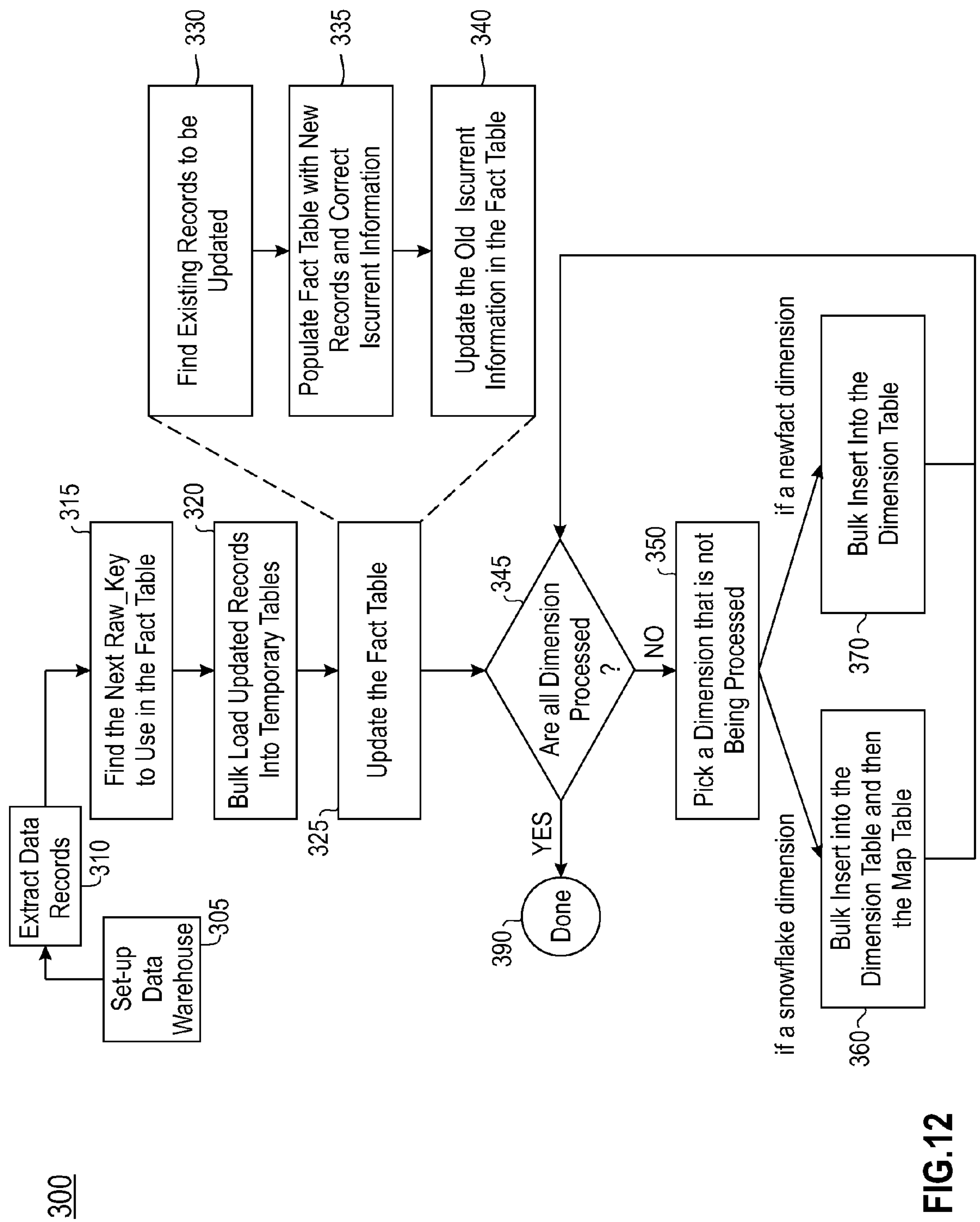
FIG. 12 is a flowchart illustrating a method of organizing and updating data records in accordance with another exemplary embodiment of the present invention.

Another exemplary embodiment may be described according to a method 300 shown in FIG. 12 and illustrated in FIGS. 13-18 and with analogous references to FIGS. 7-10.

Figure 13:
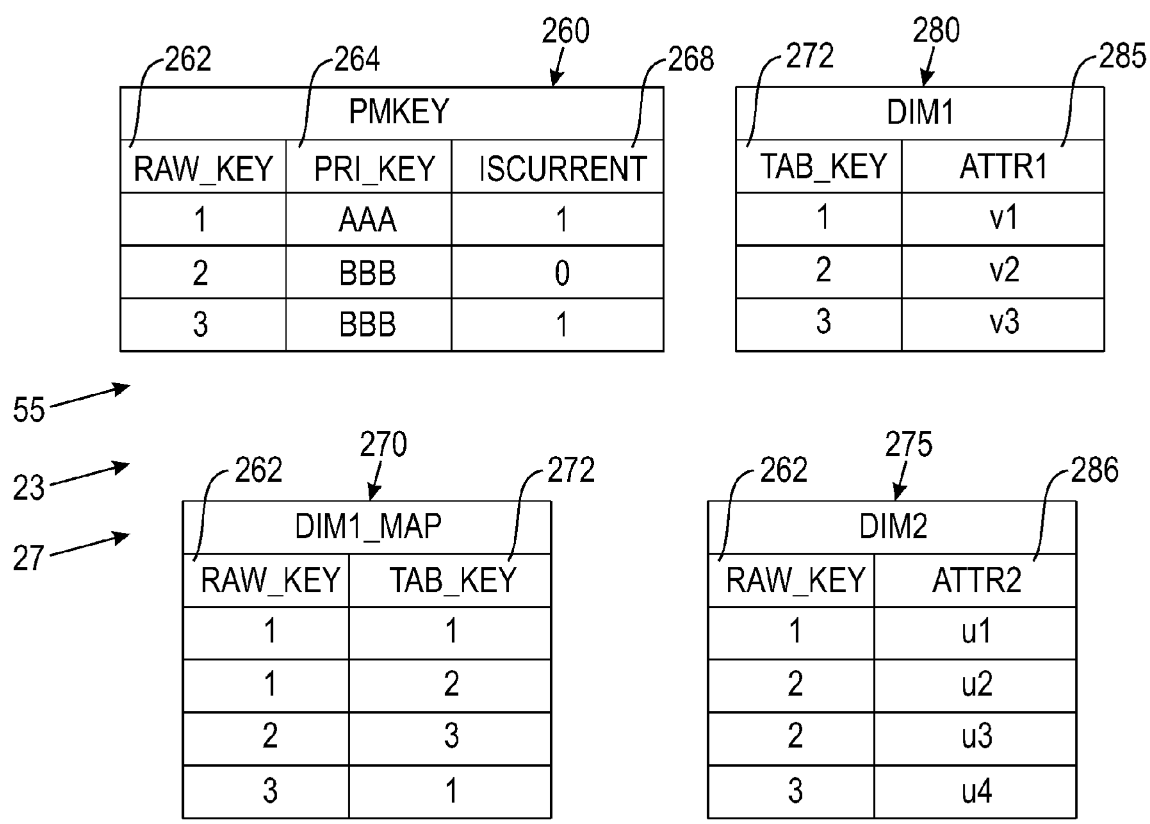
FIG. 13 is an illustration depicting a data warehouse set up in accordance with an exemplary embodiment of the present invention.

Referring to FIGS. 1, 12, and 13, a data warehouse 20 may be set up in step 305 by way of the data warehouse engine 25. In an exemplary embodiment, the data warehouse 20 may comprise a fact table 260 along with dimension tables 275 and 280. It will be understood that the fact table 260 and dimension tables 275 and 280 may be labeled and set up according to a particular application and that any desirable number of dimensions may be utilized and any data warehouse schema may be employed in the setup. For example, in FIG. 13, the data warehouse 20 may be set up using snowflake and newfact model schemas. The fact table 260 may be labeled "PMKEY" and may include data records 55 organized by column. In this exemplary illustration, the fact table 260 may include columns labeled: "RAW_KEY"; "PRI_KEY"; and "ISCURRENT". The column labeled "RAW_KEY" may represent raw key entries 262 of data records 55 into the fact table 260. In this example, the fact table 260 depicts three entries 262 of data records 55 numbered "1", "2", and "3" representing the number of entries 262 in the fact table 260 at the present state. Each raw key entry 262 may be associated with a primary key 264 representing a primary attribute for a data record represented by the column labeled "PRI_KEY". The "PRI_KEY" column may be user defined; representing for example, a file name or a URL. A current version status value 268 may be represented by the column labeled "ISCURRENT" representing a version status signifying if the version number 266 is the latest version of the data record 55. In one exemplary embodiment, a value of "0" may signify that the current version status 268 is not the most current version and a value of "1" may signify that the current version status is the most current version.

Referring still to FIG. 13, the data warehouse 20 may also include a dimension table 280 labeled "DIM1", a dimension table 275 labeled "DIM2" and a map table 270 labeled "DIM1_MAP". The dimension table 280 depicts a snowflake model and may comprise two columns representing a TAB_KEY record 272 and an attribute 285. The dimension table 275 depicts a newfact model and may comprise a column representing occurrences of raw key entries 262 and a column representing occurrences of an attribute 286. The map table 270 may comprise a column representing occurrences of raw key entries 262 and a column representing the TAB_KEY record 272.

In one exemplary embodiment, the relationship among the elements in FIG. 13 may be as follows. Each raw key entry 262 increases by an increment of one for each occurrence of a primary key 264 entered into the fact table 260. Each entry of a data record 55 into the fact table 260 results in an incremental increase in the raw key 262. Each raw key 262 may be tied to an occurrence of a primary key 264, and the current version status for each primary key 264 occurrence. In this exemplary illustration, there are three entries of data records 55 in the data warehouse 25 as depicted by the column labeled RAW_KEY; in other words there are three raw keys 262. There are two primary keys 264 labeled "AAA" and "BBB". The primary key 264 labeled "BBB" occurs twice in the current state of the fact table 260. Raw key 262 numbered "2" depicts the first occurrence of primary key 264, "BBB" and shows the current version status 268 as not being the most current. Raw Key 262 numbered "3" depicts the second occurrence of primary key 264, "BBB" and shows the current version status as being the most current.

Referring back also to FIG. 12, step 310 may include extracting new data records 35 from data sources 30. The method 300 may include analyzing the fact table 260 for the latest raw key value 262 and, in step 315 associating the next raw key value 262 with a new data record 35 and its primary key 264 extracted from the data sources 30. It will be understood that the step 315 may be repeated for every new data record 35 that may be desired for transfer to the fact table 260.

Figure 14:
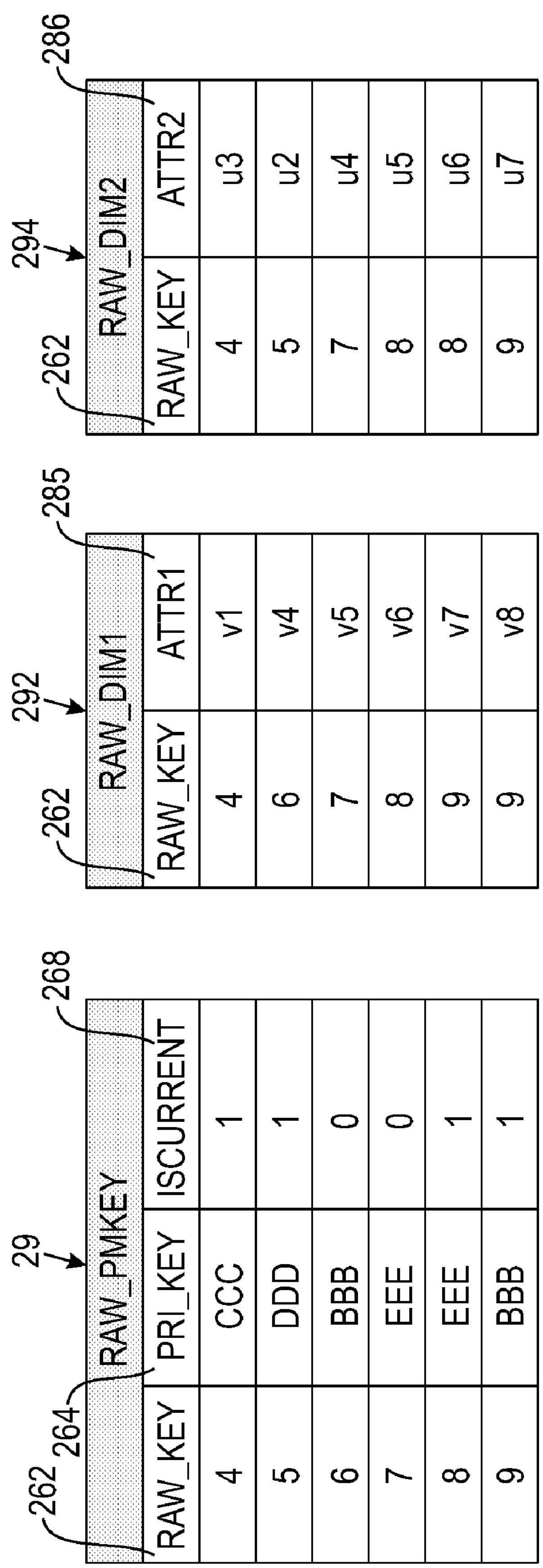
FIG. 14 is an illustration depicting a data warehouse with temporary tables set up in accordance with an exemplary embodiment of the present invention.

Referring to FIGS. 1, 12, and 14, temporary tables 265 may be set up in the data warehouse 20 for the temporary storage and organization of new data records 35. The temporary tables 265 may include a temporary staging fact table 290 may be labeled "RAW_PMKEY". In this exemplary illustration, the fact table 290 may include columns analogous to the columns labeled in fact table 260 including: "RAW_KEY"; "PRI_KEY"; and "ISCURRENT" with analogous values entered in each respective column. The temporary tables 265 may also include temporary staging dimension tables 292 and 294 labeled "RAW_DIM1" and "RAW_DIM2" respectively. Temporary staging dimension table 292 may include a column labeled "RAW_KEY" representing raw key values 262 and a column labeled "ATTR1" representing attribute values 285. Temporary staging dimension table 294 may include a column labeled "RAW_KEY" representing raw key values 262 and a column labeled "ATTR2" representing attribute values 286.

In step 320, a bulk loading of new data records 35 may be inserted into the temporary tables 265. The new data records 35 may be inserted into the temporary staging fact table 290 and depending on the attribute values of individual new data records 35, entries may be inserted into the temporary dimension tables 292 and 294. For example, raw key 262 numbered "4" associated with primary key 264 "CCC" includes an attribute 85 that may be updated according to temporary dimension table 292. The same is depicted for raw keys 262 numbered "6" and "9" associated with primary key 264 "BBB" and raw keys 262 numbered "7" and "8" associated with primary key 264 "EEE". For illustrative purpose, it is also depicted that a new data record 35 entered as raw key 262 numbered "5" may not be entered into the temporary dimension table 292 because it may not have an attribute value 285 qualifying it for insertion.

The values for the current version status 268 may be computed using a "localized" strategy by the data warehouse engine 25. For example, since the primary key 264 labeled "BBB" occurs twice in "RAW_PMKEY" temporary staging table 290, the first occurrence may be considered as not current, while the second one may be current as depicted in FIG. 14.

Figure 15:
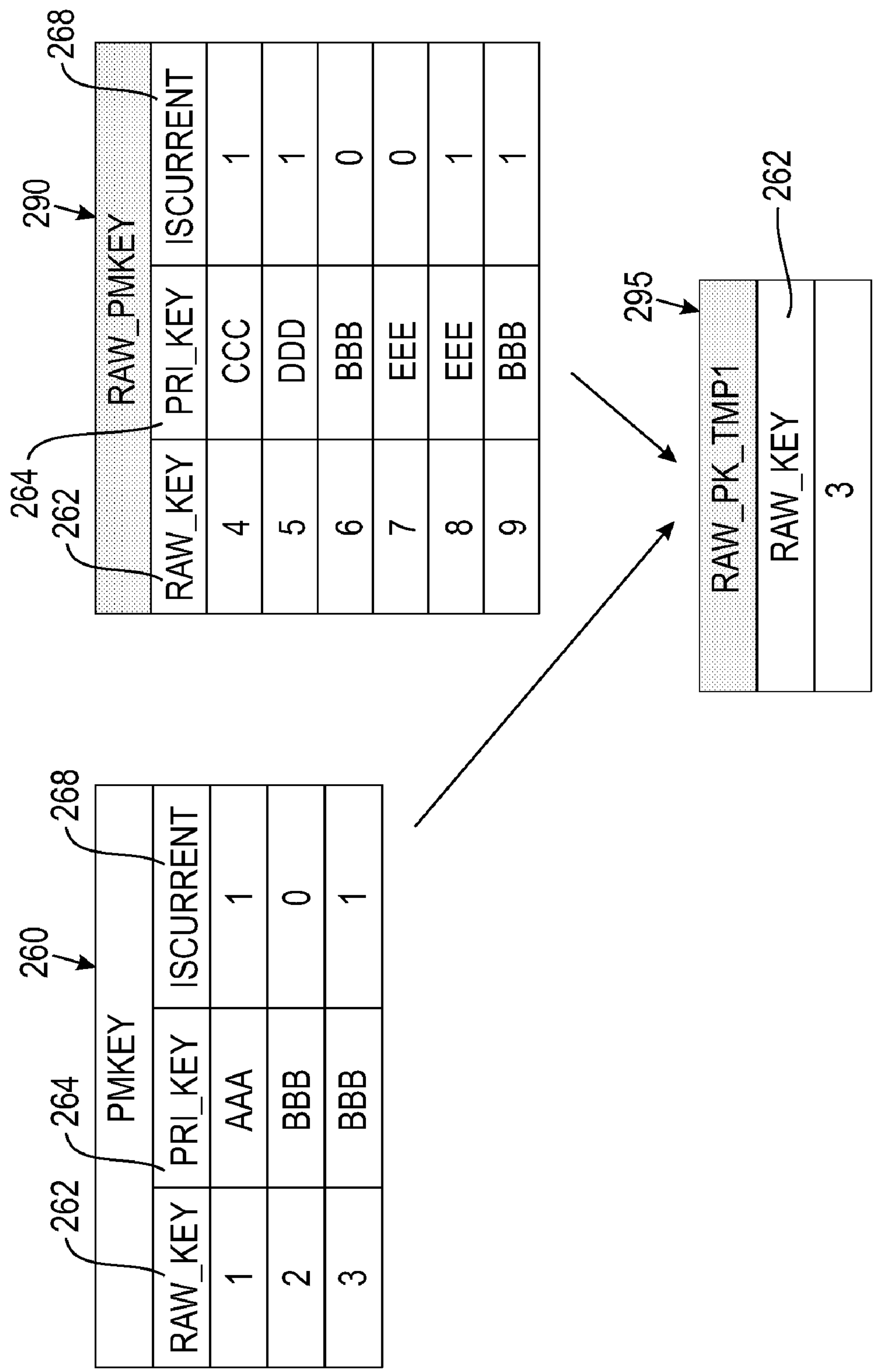
FIG. 15 is an illustration depicting a step of updating and organizing data records in accordance with an exemplary embodiment of the present invention.

Referring to FIGS. 1, 2, and 15, once the new data records 35 are bulk-loaded into different temporary dimension tables 292 and 294 and the temporary staging table 290, the method 300 may, in step 325 update the fact table 260. Step 325 may include steps 330, 335, and 340 described as follows. In step 330, the data warehouse engine 25 may identify which data records 55 may be meant for new versions of existing data records 23 in the data warehouse and which ones may be meant for new insertions. The data warehouse engine 25 may employ "join" executable command functions. A "join" function may be executed between the "RAW_PMKEY" temporary staging table 290 and the "PMKEY" fact table 260 may distinguish which data records 55 are to be updated and which ones are to be inserted. An exemplary resulting temporary table 295, "RAW_PK_TMP1" is depicted employing such a "join" function. The "join" conditions may be described as "PMKEY.PRI_KEY=RAW_PMKEY.PRI_KEY" where "PMKEY.ISCURRENT=1. RAW_PK_TMP1" may contain respective latest data records 55 that are to be updated with new versions. One manner of performing the "join" function may include locating existing records 23 in "PM_KEY" fact table 260 with a current version status 268 of "1" and whose primary key 264 occurs in the "RAW_KEY" temporary staging table 290.

Figure 16:
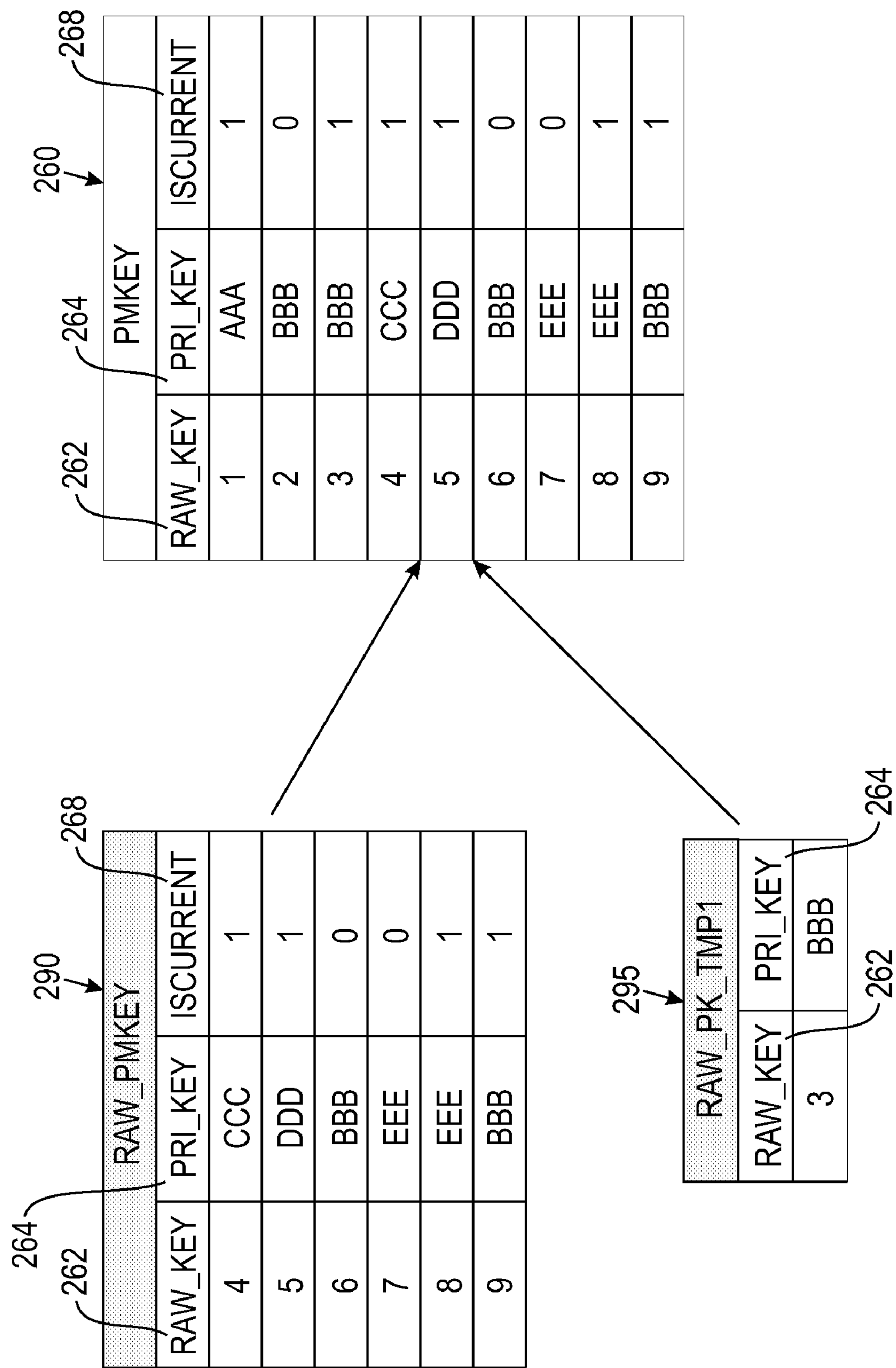
FIG. 16 is an illustration depicting a step of updating and organizing data records in accordance with an exemplary embodiment of the present invention.

Referring to FIG. 16, step 335 may include populating new data records 35 processed in the "RAW_PMKEY" temporary staging table 290 into the "PM_KEY" fact table 260. The temporary table 295 "RAW_PK_TMP1" may be used to compute the correct version numbers for new data records 35. An exemplary SQL to compute the population of the fact table 260 may be described as:

```
SELECT A.RAW_KEY, A.PRI_KEY, A.VERSION+COALESCE(B.MAXVERSION, 0), A.ISCURRENT
FROM RAW_PMKEY A, RAW_PK_TMP1 B
WHERE A.PRI_KEY=B.PRI_KEY
```

Figure 17:
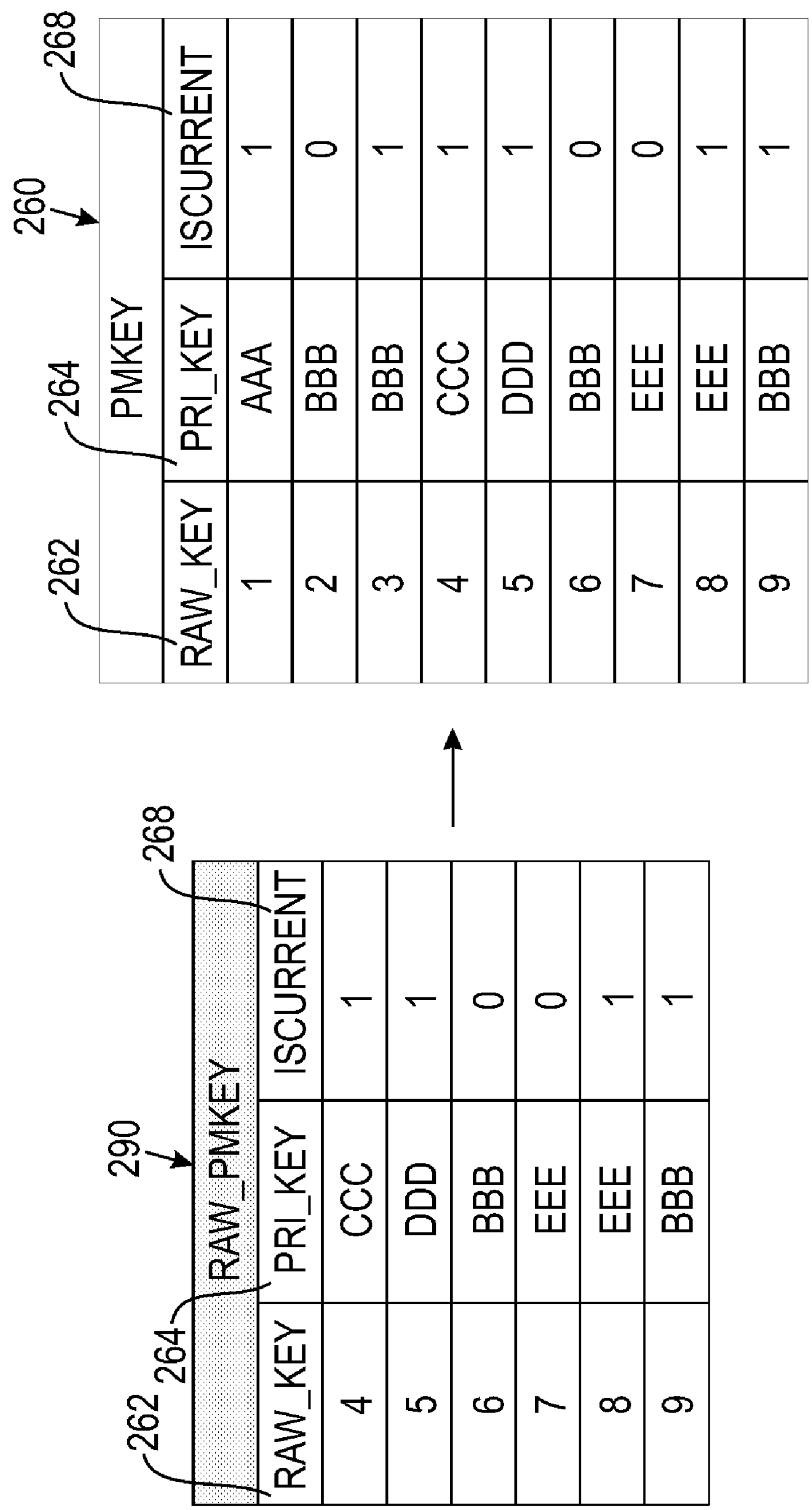
FIG. 17 is an illustration depicting a step of updating and organizing data records in accordance with an exemplary embodiment of the present invention.

As illustrated in FIG. 17, step 340 may include updating the old current version status 268 in the "PMKEY" fact table 260 may be updated. One manner of updating the current version status 260 may include changing the current version status to "0" in the "PM_KEY" fact table 260 for all the raw key values 262 in the fact table 260 corresponding to raw key values 262 in the "RAW_PK_TMP1" temporary table 295.

The method 300 may check in step 340, for processing of all dimensions. For those dimensions still needing processing, the data warehouse engine 25 may bulk-load the new data records 35 into the temporary dimension tables 292 and 294. For illustrations that may represent the processing of data records 55 in step 340, one may refer back to FIGS. 8-10. In these exemplary depictions, the temporary dimension tables 292 and 294 of the present embodiment may correspond to the temporary dimension tables 92 and 94 of FIGS. 8-10. Likewise, the dimension table 80 may correspond to the dimension table 280, the dimension table 75 may correspond to dimension table 275, the raw key entry 62 may correspond to raw key entry 262, primary key 64 may correspond to primary key 264, current status value 68 may correspond to current status value 268, tab key 72 may correspond to tab key 272, attribute 85 may correspond to attribute 285, and attribute 86 may correspond to attribute 286. For example, in FIG. 8, "RAW_DIM1" temporary table 292 may have its data records 55 moved into the dimension table 280, "DIM1". The TAB_KEY values 272 may be internally generated and as illustrated, new values may be inserted in the dimension table 280. In some embodiments, data records 55 already appearing in dimension table 280 may not be transferred from temporary dimension table 292. In this example, the attribute value 285 of "v1" is not inserted because it previously appears in the dimension table 280, "DIM1".

Thus, new data records 35 may be populated from the temporary tables 265 for each dimension in step 260. As illustrated in FIG. 8, for a snowflake dimension, a "left-join" based bulk insertion may be performed to insert data records 55 from the temporary dimension table 292 "RAW_DIM1" into the dimension table 280 "DIM1". Unique new values in temporary dimension table 292 "RAW_DIM1" may be inserted into dimension table 280 "DIM1". The map table 270 "DIM1_MAP" may be populated by joining the temporary dimension table 292 "RAW_DIM1" and dimension table 280 "DIM1" tables on the attribute value 285 column "ATTR1" and selecting the corresponding raw key value 262 and tab key value 272. FIG. 9 illustrates an exemplary result for processing a snowflake dimension.

As illustrated in FIG. 10, step 280 may comprise bulk inserting data records 55 into a newfact dimension schema. Bulk insertion in a newfact dimension may include a "left-join" based bulk insertion to insert data records 55 from the temporary dimension table 294 "RAW_DIM2" into the dimensional table 275 "DIM2".

In step 290, the method 300 may be done and an exemplary result of the previous steps as illustrated in FIGS. 13-17 and 7-10 may be depicted in FIG. 18. FIG. 18 depicts an updated fact table 260 "PM_KEY" and an updated map table 270 and dimension tables (275, 280) for each dimension that needed updating.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood, of course, that the foregoing relates to exemplary embodiments of the invention and that modifications may be made without departing from the spirit and scope of the invention as set forth in the following claims.

We claim:

1. A method for use with a data warehouse whose data records are recorded on a storage medium and wherein the data warehouse is managed by a data warehouse engine and wherein the data warehouse includes a fact table including a primary key associated with each respective data record and wherein the fact table organizes respective data records by their respective primary key, the method comprising the steps of:

identifying existing data records in the fact table by their respective primary keys;

assigning a first version number to respective existing data records in the fact table wherein the first version number is tied to a first occurrence of a primary key in the fact table;

extracting new data records from at least one data source;

evaluating each of the new data records for a respective primary key identifying each of said new data records;

setting up temporary tables including a temporary fact table;

loading the new data records into the temporary tables;

assigning an updated version number to new data records with a primary key that matches the primary key of an existing data record; and populating the fact table in the storage medium with the new data records wherein the new data records include respective updated version numbers and wherein the fact table further includes the existing data records.

2. The method of organizing and updating data of claim 1, further comprising:

identifying, in the fact table, the highest version number associated with a primary key of existing and new data records; and distinguishing between which of the existing data records are to be updated and which are to be newly inserted, wherein the distinguishing is performed by joining the fact table and the temporary tables.

3. The method of organizing and updating data of claim 2, further comprising identifying respective new data records as a most current version wherein the most current version is determined by the highest version number associated with a primary key.

4. The method of organizing and updating data of claim 3 wherein the populating of the fact table further includes identifying existing data records as not being the most current version.

5. The method of organizing and updating data of claim 1 wherein the populating of the fact table includes inserting the new data records in bulk.

6. The method of organizing and updating data of claim 1 wherein:

the fact table further includes a dimension table comprising attribute values associated with respective primary keys;

the setting up of temporary tables further includes a temporary dimension table; and a change to the attribute value of a primary key causes the assigning of the updated version number.

7. The method of organizing and updating data of claim 6 wherein:

the data warehouse is characterized by a snowflake schema;

the dimension table uses a snowflake model; and the data warehouse further includes a map table, wherein the new data records are inserted into the dimension table and the map table during population of the fact table.

8. The method of organizing and updating data of claim 1 wherein the data warehouse includes a raw key identifying each occurrence of respective primary keys.

9. The method of organizing and updating data of claim 1 wherein the fact table includes maintaining both existing data records and new data records for reference.

10. A method for use with a data warehouse whose data records are recorded on a storage medium and wherein the data warehouse is managed by a data warehouse engine and wherein the data warehouse includes a fact table including a primary key associated with each respective data record and wherein the fact table organizes respective data records by their respective primary key, the method comprising the steps of:

identifying existing data records in the fact table by their respective primary keys;

assigning a current version status to respective existing data records in the fact table, wherein the current version status identifies whether the primary key of an existing data record is a most current version of the primary key;

extracting new data records from at least one data source;

evaluating each of the new data records for a respective primary key identifying each of said new data records;

setting up temporary tables including a temporary fact table;

bulk loading the new data records into the temporary tables;

identifying updated primary keys as the most current version in the new data records when a primary key of a new data record matches the primary key of an existing data record; and populating the fact table in the storage medium with the new data records wherein the new data records include the new data records identified as the most current version and wherein the current version status of primary keys associated with the new data records identified as the most current version are updated.

11. The method of organizing and updating data of claim 10 wherein the fact table includes maintaining both existing data records and new data records for reference.

12. The method of organizing and updating data of claim 10 wherein:

the fact table further includes a dimension table comprising attribute values associated with respective primary keys;

the setting up of temporary tables further includes a temporary dimension table; and a change to the attribute value of a primary key causes identifying updated primary keys as the most current version in the new data records.

13. The method of organizing and updating data of claim 12 wherein:

the data warehouse is characterized by a snowflake schema;

the dimension table uses a snowflake model; and the data warehouse further includes a map table, wherein the new data records are inserted into the dimension table and the map table during population of the fact table; and the map table is created by joining the dimension table and the temporary dimension table.

14. The method of organizing and updating data of claim 10 wherein the data warehouse includes a raw key identifying each occurrence of respective primary keys.

15. A system, comprising:

a computer including a central processing unit for an extraction and organization of data from one or more data sources; and a data warehouse configured to store and update data from the one or more data sources, wherein the data warehouse includes a schema comprising a fact table storing existing data records, wherein the data warehouse further includes temporary tables configured to receive new data records in bulk from the computer, wherein the central processing unit evaluates the new data records for updated copies of the stored existing data records and assigns a version number to the existing and new data records, wherein the central processing unit provides an update to the fact table by bulk insertion of the new data records into the fact table, and wherein the existing and new data records are identified by the version number.

16. A computer program product for updating data records in a data warehouse managed on a storage medium, comprising:

a computer usable medium having computer usable program code embodied therewith, the computer usable program code comprising:

a set of instructions for extracting new data records from a data source;

a set of instructions for assigning a raw key entry to each new data record extracted;

a set of instructions for bulk loading the new data records into temporary tables;

a set of instructions for finding existing data records to be updated;

a set of instructions for updating found existing data records to be updated;

a set of instructions for assigning a version number to updated data records; and a set of instructions for populating a fact table in the data warehouse of the storage medium with the updated data records.

17. The computer program product of claim 16, wherein the computer usable program code further comprises a set of instructions for assigning a current version status to existing and updated data records; and a set of instructions for incrementing the raw key entry for each entry of one of the data records in the fact table, and for each occurrence of a primary key in the fact table.

18. The computer program product of claim 16, wherein the computer usable program code further comprises a set of instructions for calculating a maximum version number for respective updated data records.

19. The computer program product of claim 16, wherein the computer usable program code further comprises a set of instructions for storing existing and updated data records in the fact table.

20. The computer program product of claim 16, wherein the computer usable program code further comprises a set of instructions for updating dimensions of existing data records.

* * * * *